(12) United States Patent
Waite

(10) Patent No.: US 7,448,406 B1
(45) Date of Patent: Nov. 11, 2008

(54) HYDRAULIC COUPLER PRESSURE RELIEF TOOL

(76) Inventor: George D. Waite, P.O. Box 66, Atwood, CO (US) 80722

( * ) Notice: Subject to any disclaimer, the term of this patent is extended or adjusted under 35 U.S.C. 154(b) by 246 days.

(21) Appl. No.: 11/430,733

(22) Filed: May 9, 2006

Related U.S. Application Data

(60) Provisional application No. 60/679,161, filed on May 9, 2005.

(51) Int. Cl.
F16K 15/18 (2006.01)
(52) U.S. Cl. ...................... 137/522; 137/322
(58) Field of Classification Search ............... 137/522, 137/231, 322; 251/149.6; 285/39
See application file for complete search history.

(56) References Cited

U.S. PATENT DOCUMENTS

| | | | |
|---|---|---|---|
| 929,561 A | 7/1909 | Corlew | |
| 950,263 A | 2/1910 | Harpster | |
| 1,150,420 A | 8/1915 | Davis et al. | |
| 1,168,145 A | 1/1916 | Baker | |
| 1,392,231 A | 9/1921 | Shimada | |
| 1,540,782 A | 6/1925 | Kramer | |
| 1,633,642 A | 6/1927 | Kramer | |
| 2,107,970 A * | 2/1938 | Wells | 60/482 |
| 2,213,309 A | 9/1940 | Fortune | |
| 2,235,572 A | 3/1941 | Culbertson | |
| 2,649,825 A | 8/1953 | Fisher | |
| 2,729,063 A * | 1/1956 | Earl | 60/430 |
| 2,751,927 A | 6/1956 | Kinney | |
| 2,765,806 A | 10/1956 | Webster | |
| 2,821,877 A * | 2/1958 | Swanson | 72/445 |
| 2,869,407 A * | 1/1959 | Swanson | 72/409.01 |
| 2,889,849 A | 6/1959 | Shohan | |
| 2,898,128 A | 8/1959 | Shohan | |
| 2,979,072 A | 4/1961 | Webster | |
| 3,154,981 A * | 11/1964 | McDurmont | 72/402 |
| 3,443,581 A | 5/1969 | Lyell | |
| 3,532,110 A | 10/1970 | Peterson | |
| 3,718,057 A | 2/1973 | Berchtold | |
| 3,730,221 A | 5/1973 | Vik | |
| 3,752,179 A | 8/1973 | Atkins et al. | |
| 3,855,882 A | 12/1974 | Wittmann | |
| 4,031,619 A * | 6/1977 | Gregory | 30/180 |
| 4,132,107 A * | 1/1979 | Suganuma et al. | 72/416 |
| 4,499,796 A | 2/1985 | Miller | |
| 4,589,272 A * | 5/1986 | Hutson | 72/453.16 |
| 4,728,076 A | 3/1988 | Ganshorn et al. | |
| 4,947,672 A * | 8/1990 | Pecora et al. | 81/301 |
| 5,182,841 A * | 2/1993 | Park et al. | 29/229 |
| 5,507,530 A | 4/1996 | Mahaney | |

(Continued)

Primary Examiner—Craig M Schneider
(74) Attorney, Agent, or Firm—Robert L. Farris; Farris Law, P.C.

(57) ABSTRACT

The hydraulic pressure relief tool opens a check valve in the male portion of a hydraulic line coupler. The male portion has a locking ball receiving groove. The tool includes a male coupler holder and a coupler retainer that are pivotally connected together. The male coupler has a U-shaped groove. The sides of the groove slide in the ball receiving groove. The male coupler engaging surface on the retainer is moved across the U-shaped groove to lock the coupler to the tool. A fluid deflector housing covers a portion of the U-shaped groove. A check valve opener is mounted in a threaded passage in the housing. A valve engaging surface on the opener is advanced to open the check valve.

11 Claims, 4 Drawing Sheets

U.S. PATENT DOCUMENTS

| | | | |
|---|---|---|---|
| 5,662,139 A * | 9/1997 | Lish | 137/523 |
| 5,758,681 A * | 6/1998 | DeBriae et al. | 137/12 |
| 5,775,880 A * | 7/1998 | Vensland et al. | 417/53 |
| 5,901,736 A | 5/1999 | McCauley | |
| 6,564,610 B2 * | 5/2003 | Lefavour et al. | 72/453.16 |
| 6,641,109 B1 | 11/2003 | Twiestmeyer | |
| 6,666,064 B2 * | 12/2003 | LeFavour et al. | 72/453.15 |

* cited by examiner

HYDRAULIC COUPLER PRESSURE RELIEF TOOL

CROSS REFERENCE TO RELATED APPLICATION

This application claims the benefit of the filing date of U.S. Provisional Application No. 60/679,161, titled "HYDRAULIC COUPLER PRESSURE RELIEF TOOL" filed May 9, 2005.

TECHNICAL FIELD

The hydraulic pressure relief tool releases hydraulic pressure from a male hydraulic coupler component of a hydraulic quick coupler so that the male and female components of the hydraulic quick coupler can be coupled together.

BACKGROUND OF THE INVENTION

Hydraulic drive systems are employed on a variety of machines to perform various tasks. Many of the tasks require linear actuators or hydraulic motors. The linear actuators are often double acting and therefore require two hydraulic lines. The hydraulic motors all require a hydraulic fluid supply line and a hydraulic return line.

The machines that have hydraulic actuator systems have a pump driven by a power source and may have multiple attachments that are changed from time to time. To change from one attachment to another, hydraulic quick couplers have been developed. Hydraulic quick couplers generally include a male portion and a female portion. Both portions generally have check valves that close when they are disconnected. These check valves close to prevent the loss of hydraulic fluid and to reduce contamination of the hydraulic systems. Fine sand, dust, and liquid contaminants will cause serious damage to hydraulic systems and shorten their useful life. The check valves automatically close when the couplers are disconnected. Both check valves are open when the couplers are connected.

The male coupler portion of a hydraulic coupler is relatively easy to clean. The female coupler portion of a hydraulic coupler is somewhat more difficult to clean. Plugs can be used to help keep the female coupler portion clean when not in use. The general practice employed in most hydraulic systems is to attach the female coupler portion directly to a control valve. The control valve is connected to the pump that supplies hydraulic fluid under pressure and to a sump. The female coupler portion is generally in use when the pump is in use. The male coupler is generally connected to the actuator or motor on a device that is to receive and to be driven by hydraulic fluid. The male couplers occasionally sit for periods of time unused.

The male coupler portion is often connected to a closed system when it is disconnected from the female coupler portion. The closed system will contain some hydraulic fluid. The closed system may even be pressurized if there is an actuator in the system that is loaded. Hydraulic fluid is substantially uncompressable. However, the volume of most hydraulic fluids change with changes in temperature. A temperature increase of the hydraulic fluid in a closed system can increase the pressure to the point that the male coupler portion can not be manually connected to a female coupler portion. In order to couple the male coupler portion to a female coupler portion, some hydraulic fluid under pressure may have to be released from the closed system. If an actuator in the closed system is supporting a load, it can be necessary to drain a quantity of hydraulic fluid from the system.

During the release of hydraulic fluid under pressure from any hydraulic system, care must be taken to avoid contact with high velocity streams of fluid as well as hot fluids and cold fluids. Fluids release from a pressurized system can penetrate a person's skin, if moving at a high velocity, and cause injury.

SUMMARY OF THE INVENTION

The hydraulic coupler pressure relief tool includes a male coupler holder. The coupler holder has a holder end with a U-shaped slot. The slot has an open end, a pair of spaced apart side walls and a slot closed end. A hand holder end of the coupler holder has a hand grip surface. A pivot pin bore passes through the mail coupler holder between the U-shaped slot and the hand holder end. A coupler retainer includes a retainer bar end, a retainer hand holder end, a retainer hand grip on the retainer hand holder end and a male coupler engaging surface on the retainer bar end. The male coupler engaging surface on the retainer bar end faces toward the retainer hand holder end. A retainer pivot pin bore passes through the coupler retainer between the retainer bar end and the retainer hand holder end. A pivot pin passes through the retainer pivot pin bore and the pivot pin bore and pivotally connects the coupler retainer to the male coupler holder. A fluid deflector housing covers at least a portion of the U-shaped slot. A check valve opener includes a threaded shank that is received in a threaded bore through the fluid deflector housing. A handle for rotating the threaded shank is provided on one end of the threaded shank. A valve engaging surface on the threaded shank is movable toward the U-shaped slot by rotation of the threaded shank.

A male coupler passage into the fluid deflector housing permits a male hydraulic coupler slide into the U-shaped slot and into the fluid deflector housing.

BRIEF DESCRIPTION OF THE DRAWINGS

These and other objects, features and advantages will become more readily apparent in view of the following detailed description and best mode, appended claims and accompanying drawings, in which:

DETAILED DESCRIPTION OF THE PREFERRED EMBODIMENTS

Figure 1:
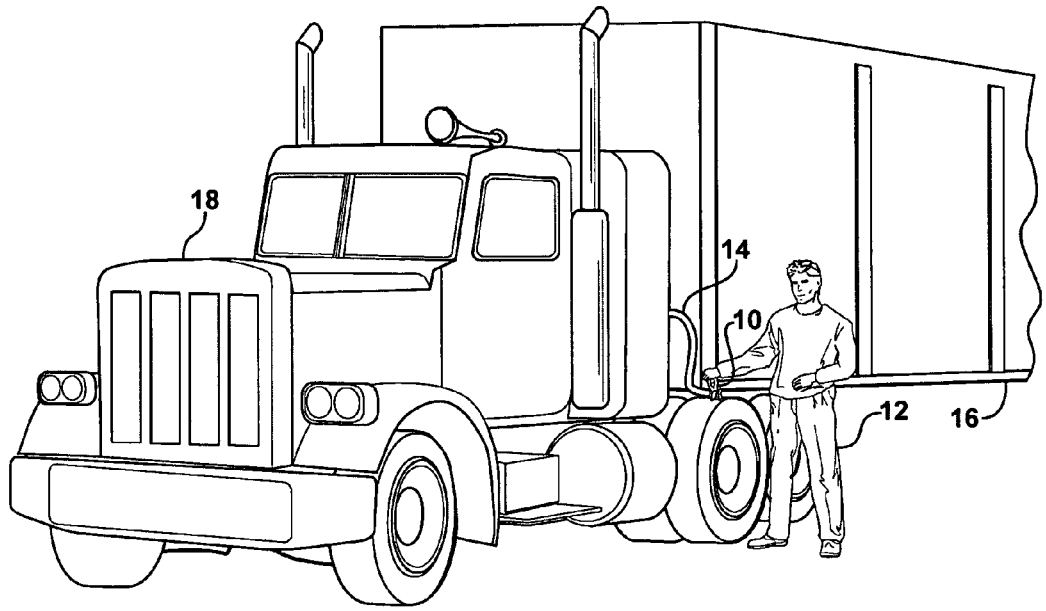
FIG. 1 is a perspective view of the hydraulic coupler pressure relief tool being used.
Figure 2:
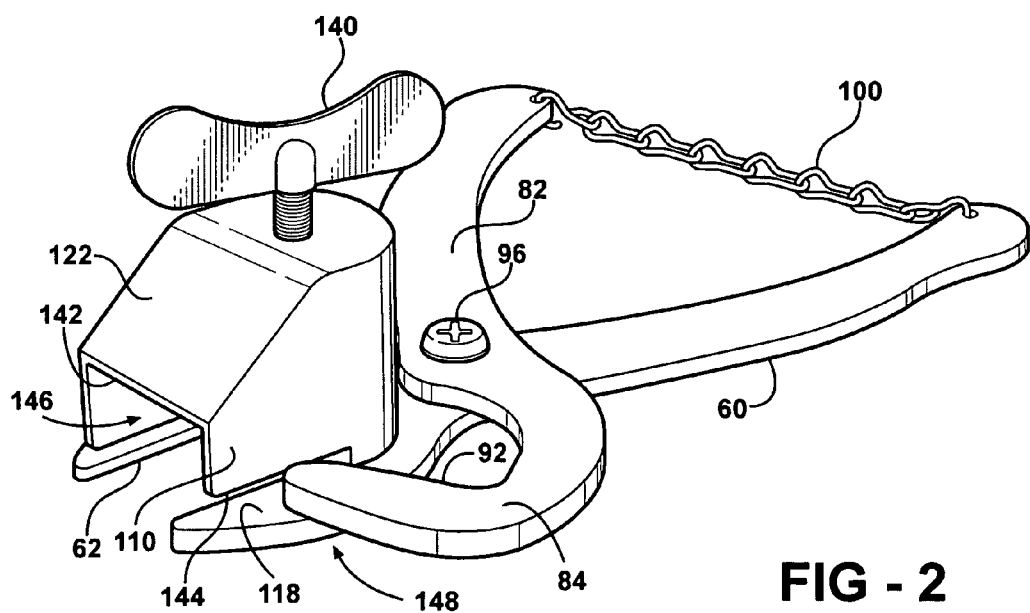
FIG. 2 is a perspective view of the hydraulic coupler pressure relief tool.
Figure 3:
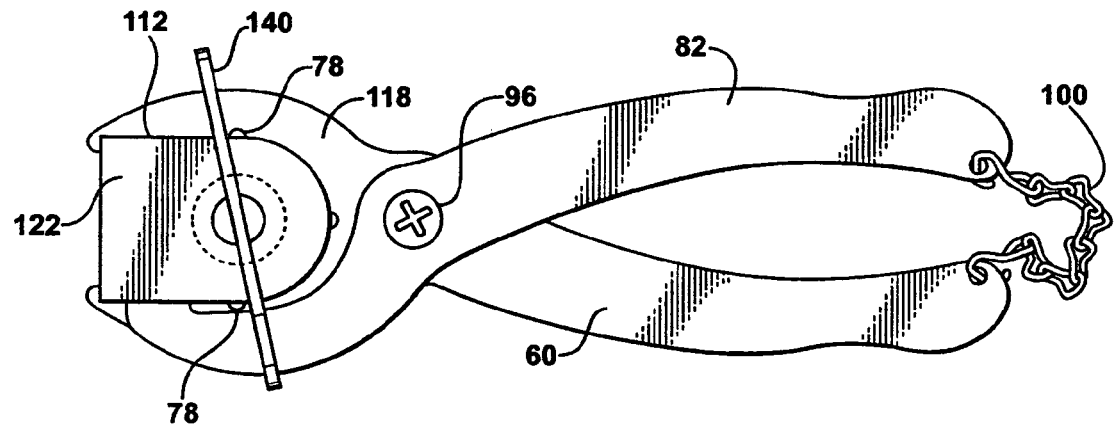
FIG. 3 is a top plan view of the hydraulic coupler pressure relief tool.
Figure 4:
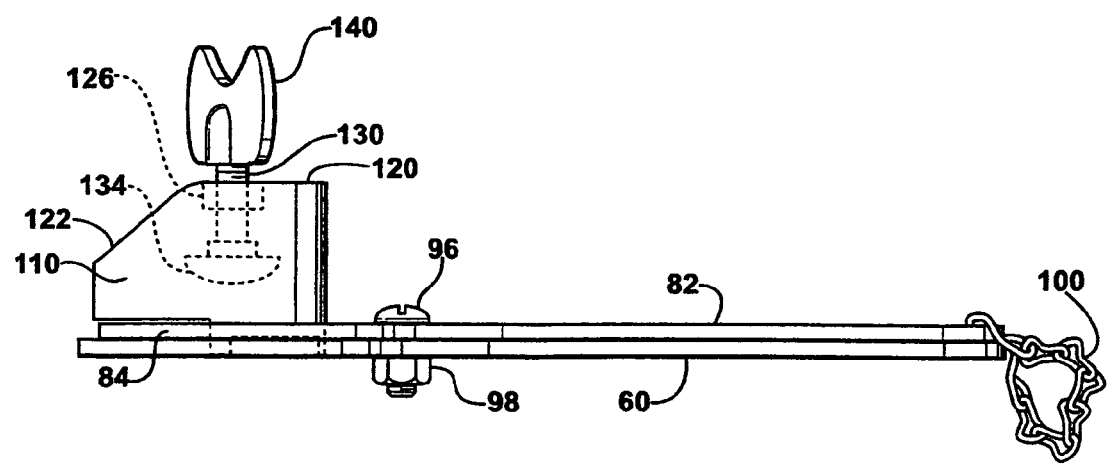
FIG. 4 is an elevational view of the hydraulic coupler pressure relief tool.
Figure 5:
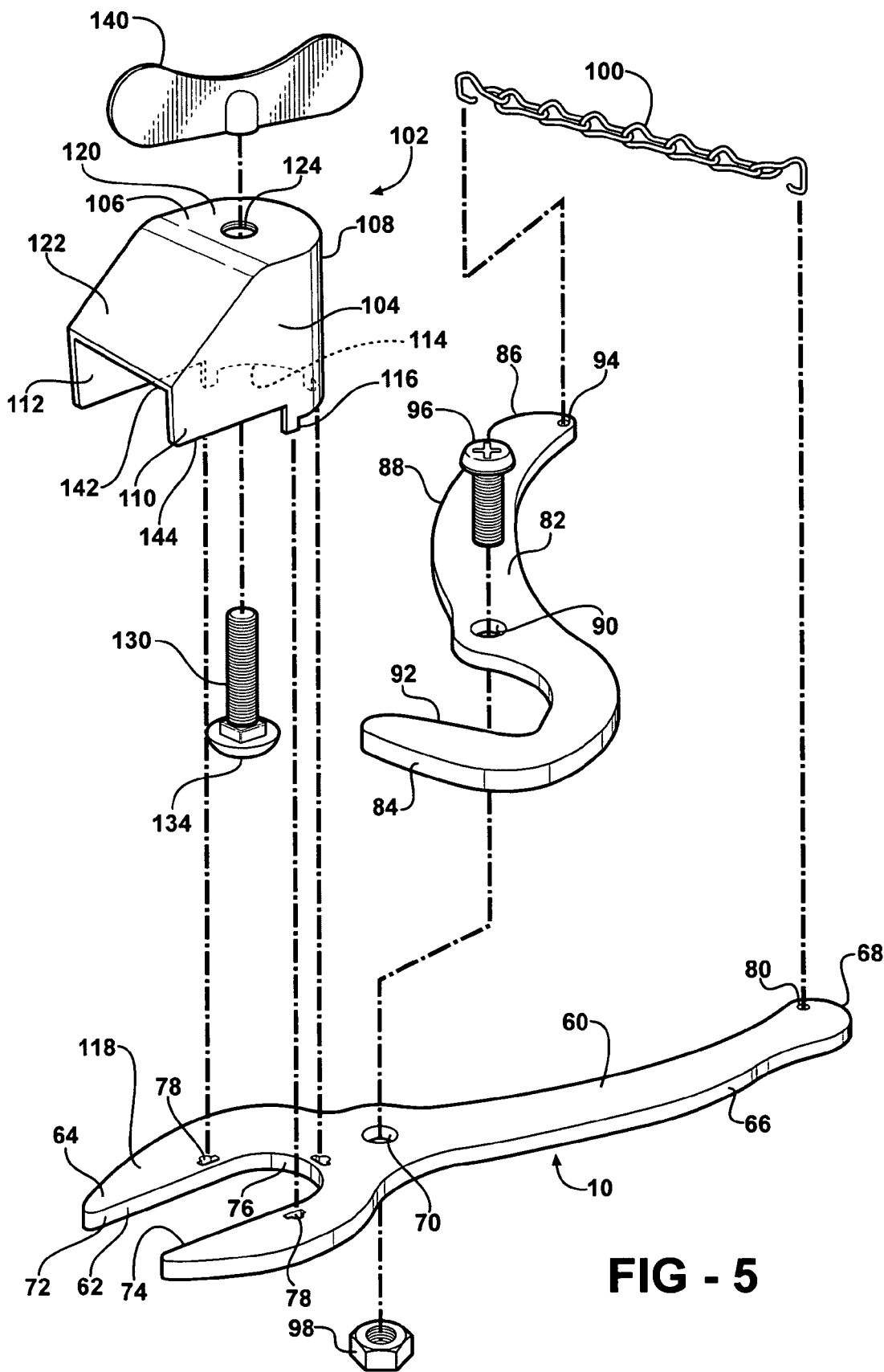
FIG. 5 is an expanded view of the hydraulic coupler pressure relief tool.

A hydraulic coupler pressure release tool 10 is being used by a person 12 to release hydraulic fluid pressure from a flexible line 14 as shown in FIG. 1. The line 14 is connected to equipment mounted on the semi-trailer 16. The equipment mounted on the trailer could be a floor conveyor for example. The engine in the tractor 18 drives a hydraulic fluid pump. After pressure is released from the flexible line 14, a male coupler portion 20 on the free end of the line 14 will be attached to a female coupler portion (not shown) mounted on the tractor 18. The female coupler portion is generally secured to the tractor 18 in a fixed position. In most hydraulic systems there is a second hydraulic line from the trailer that is connected to a second female coupler portion on the tractor 18. The second hydraulic line may be a return line that returns hydraulic fluid to a sump. The line 14 may, in some hydraulic systems become a return line at times and the second hydraulic line can shift to a supply line.

Hydraulic fluid couplers are manufactured by a number of different companies. These couplers vary in construction and size to accommodate hydraulic systems with different maximum pressures and fluid flow rates. Only male hydraulic coupler portions 20 are described below. Various common constructions of the male coupler portion 20 will be described to the extent that the hydraulic coupler pressure release tool 10 is changed to accommodate different couplers.

Figure 6A:
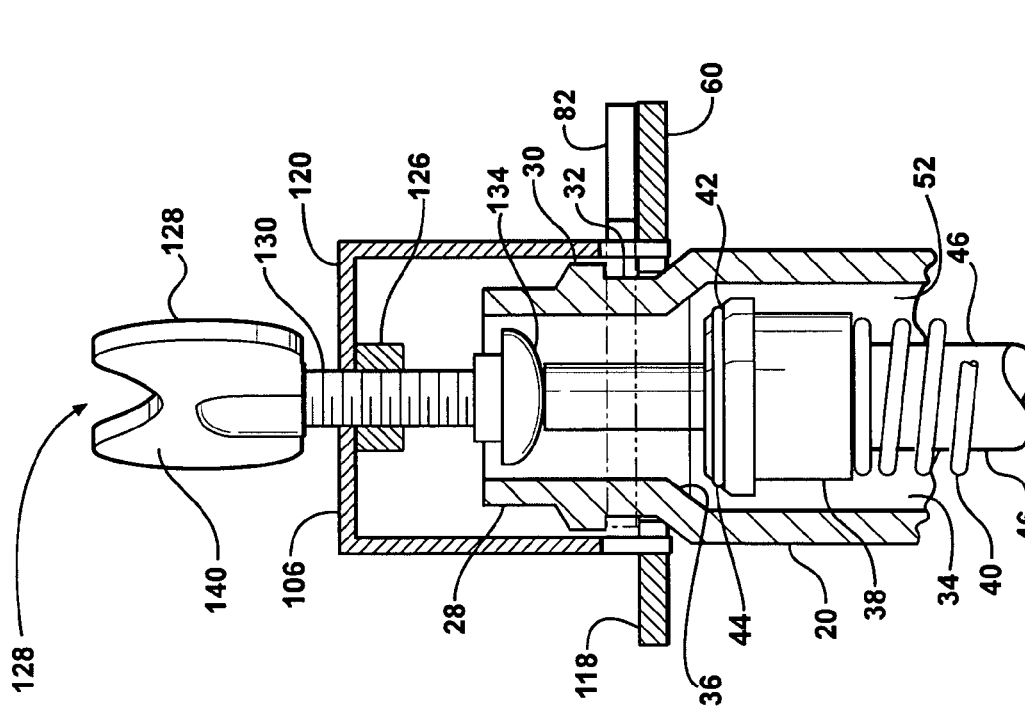
FIG. 6A is a sectional view showing a male hydraulic coupler portion held in the hydraulic coupler pressure relief tool prior to opening the check valve and with parts broken away.
Figure 6B:
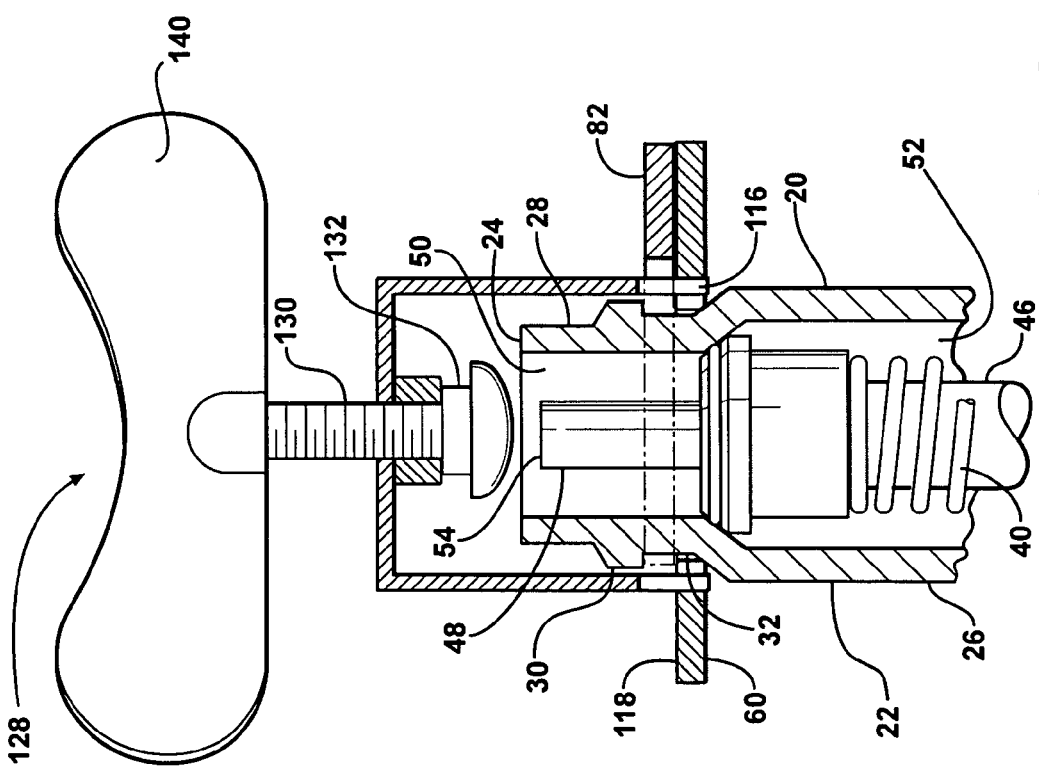
FIG. 6B is a sectional view similar to FIG. 6A with the check valve open and with parts broken away.

The male coupler portion 20, shown in FIGS. 6A and 6B, include a cylindrical housing 22 with a distal end 24 and a proximal end 26. The proximal end 26 is attached to the line 14 by a connector (not shown). Generally the proximal end 26 includes a threaded end that is attached to a threaded fitting on the line 14. In some hydraulic systems the line 14 may be a rigid pipe with a threaded fitting on its free end. The distal end 24 positions the coupler portion 20 in an axial direction relative to a female coupler portion. A small diameter cylindrical outer surface 28 adjacent to the distal end 24, radially positions the coupler portion 20 relative to the female coupler portion. A larger diameter cylindrical portion 30 of the coupler portion 20 positions a locking ball retainer sleeve of the female coupler portion radially relative to the coupler portion 20. A locking ball receiving groove 32 is provided in the coupler portion 20 in a position axially spaced from the distal end 24 a selected distance. The large diameter cylindrical portion 30 is axially positioned adjacent to the groove 32 and between the distal end 24 and the groove.

The inside bore 34 of the male coupler portion 20 includes a valve seat 36. A valve member 38 is housed in the bore 34 and is biased toward the valve seat 36 by a compression spring 40. The valve member 38 includes a valve face 42 that contacts the valve seat 36 to prevent the flow of hydraulic fluid. The valve face 42, as shown, carries a valve seal 44. The seal 44 is a resilient o-ring as shown. The valve member 38 includes a guide stem 46 that keeps the valve member 38 coaxial with valve seat 36. The valve member 38 also includes a valve control stem 48 that extends axially from the valve face 42 and toward the distal end 24 of the housing 22. The inside bore 34 through the housing 22 includes a small diameter bore 50 that extends from the distal end 24 to the valve seat 36 and is coaxial with the valve control stem 48 and a large diameter bore 52 that extends from the valve seat 36 and away from the small diameter bore 50.

The valve control stem 48 engages a female valve control stem in a female coupler portion during use and the valve member 38 and a valve in the female coupler are both opened. When both valves are open, the male coupler portion 20 and a female coupler portion are coupled together. With the free end 54 of the valve control stem 48 between the valve seat 36 and the distal end 24 of the cylindrical housing 22 when the valve face 42 is adjacent to the valve seat 36, as shown in FIG. 6A, the valve control stem in the female coupler portion must be lengthened somewhat. Some hydraulic couplers have the free end 54 of the valve control stem 48 extending out of the small diameter bore 50 when the valve member 38 is closed. With the longer valve control stem 48, the length of the valve control stem in the female coupler portion must be shortened somewhat.

The check valves in some hydraulic fluid couplers are ball check valves. With these valves the valve seat joins the distal end of the housing and the small diameter bore 50 is eliminated. The ball of a ball check valve protrudes from the housing 22 a short distance when the valve is closed. Ball check valves generally have a decreased fluid flow rating compared to couplers with the valve member 38 described above.

The hydraulic coupler pressure release tool 10 includes a male coupler holder 60 with a U-shaped slot 62 on a male coupler portion holder end 64. A hand grip 66 is provided on a hand hold end 68 of the male coupler holder 60. A holder pivot pin bore 70 through the male coupler holder 60 is between the male coupler portion holder end 64 and the hand hold end 68. The U-shaped slot 62 has parallel side walls 72 and 74 that are spaced apart a distance that is slightly more than the diameter of the base of the locking ball receiving groove 32 in the cylindrical housing 22. The closed end 76 is an arcuate surface with a radius that is half the distance between the side walls 72 and 74 of the U-shaped slot 62. Three fluid shield housing anchor passages 78 pass through the male coupler holder 60 adjacent to the U-shaped passage 62. A small diameter bore 80 is drilled through a free end of the hand holder end 68

A coupler retainer 82, of the hydraulic coupler pressure release tool 10, includes a retainer bar end 84 and a retainer hand holder end 86. The hand holder end 86 includes a hand grip 88. A retainer pivot pin bore 90 passes through the coupler retainer 82 between the retainer bar end 84 and the hand holder end 86. A male coupler engaging surface 92 on the retainer bar end 84 faces toward the retainer pivot pin bore 90. The portion of the male coupler engaging surface 92 that retains a male coupler portion is nearly tangential to a circle that is coaxial with retainer pivot pin bore 90. A small diameter bore 94 is drilled through a free end of the retainer hand holder end 86.

A pivot bolt 96 passes through the retainer pivot pin bore 90 and the holder pivot pin bore 70 and screws into a nut 98. The nut 98 is preferably a locking nut and permits the male coupler holder 60 and the coupler retainer 82 to pivot freely relative to each other.

A short chain 100 has one end anchored in the small diameter bore 80 in the hand holder end 68. The other end of the short chain 100 is anchored in the small diameter bore 94 through the retainer hand holder end 86. The short chain 100 limits pivotal movement of the retainer bar end 84 away from the U-shaped slot 62. The chain 100 is also used for hanging the hydraulic coupler pressure release tool 10 on a hook or pin member when not in use.

A fluid deflector housing 102 includes a deflector wall 104 and a fluid deflector top 106. The deflector wall 104 has an arcuate center section 108 and spaced apart parallel end sections 110 and 112. A lower edge 114 of the housing 105 seats on the surface 118 of the male coupler holder 60. Tongues 116 extend downward from the lower edge 114 and pass through the anchor passages 78 through the holder 60. The tongues 116 are fixed to the holder 60 by welding or other suitable anchoring system. The deflector top 106 has an upper wall section 120 that is parallel to the surface 118 of the male coupler holder 60. An inclined upper wall section 122 extends from upper wall section 120, toward the surface 118 and ends at a lower free edge 142.

A bore 124 is provided through the upper wall section 120. A threaded nut 126 is welded to an inside or bottom surface of the deflector top 106 in a position coaxial with the bore 124. A check valve opener 128 includes a threaded shank 130 that screws through the nut 126. An end 132 integral with the inside end of the threaded shank 130 has a valve engaging surface 134 that faces away from the threaded shank 130. The shape and size of the end 132 with the valve engaging surface 134 is changed as required to accommodate the check vale that is to be opened. A wing 140 is fixed to the end of the threaded shank 130 opposite the end 132. The wing 140 is turned to advance and to retract the valve engaging surface 134. If necessary, a fluid passage can be provided through the end 132.

During use of the hydraulic coupler pressure release tool 10, the locking ball receiving groove 32 is received in the U-shaped slot 62. The distal end 24 of the male hydraulic coupler portion 20 passes between the surface 118 of the male coupler holder 60 and the edge 142 of the inclined upper wall section 122. Moving the hand holder end 68 toward the retainer hand holder end 86 moves the retainer bar end 84 through a slot between the surface 118 and the edge 144 and moves the male coupler engaging surface 92 into engagement with the cylindrical male coupler housing 22. The male coupler engaging surface 92 engages the locking ball receiving groove as shown in FIGS. 6A and 6B. The coupler engaging surface 92 may engage the cylindrical portion 30 of the cylindrical housing. The wing 140 is rotated to move the valve engaging surface 134 into engagement with the free end 54 of the check valve member 38, open the valve and reduce the fluid pressure in the line 14. Hydraulic fluid that is discharged can be directed in to an open container. After the fluid pressure is reduced, the wing 140 and the shank 130 are rotated to withdraw the valve engaging surface 134 from engagement with the valve member 38. The male coupler engaging surface 92 is then pivoted about the axis of the pivot pin or pivot bolt 96 to with draw the retainer bar end 84 from the fluid deflector housing 102 and the male coupler portion 20 is removed from the U-shaped slot 62.

The invention claimed is:

1. A hydraulic coupler pressure relief tool comprising:
a male coupler holder having a holder end with a U-shaped slot having an open end, a pair of spaced apart side walls and a slot closed end, a hand hold end, and a hand grip surface on the hand hold end;
a coupler retainer, pivotally attached to the male coupler holder by a pivot member passing through a retainer pivot pin bore and a holder pivot pin bore and having a male coupler engaging surface that is engageable with male couplers to at least partially close the open end of the U-shaped slot and retain male couplers in the U-shaped slot during hydraulic coupler pressure relief;
a check valve opener attached to the male coupler holder and including a valve engaging surface that engages and opens male coupler valves held in the U-shaped slot upon movement of the valve engaging surface toward the U-shaped slot.

2. A hydraulic coupler pressure relief tool, as set forth in claim 1, including a fluid deflector that deflects high pressure hydraulic fluid released from check valves by the check valve opener.

3. A hydraulic coupler pressure relief tool, as set forth in claim 2 wherein the fluid deflector includes a fluid deflector housing attached to the male coupler holder and covering at least a portion of the U-shaped slot.

4. A hydraulic coupler pressure relief tool, as set forth in claim 3, wherein the check valve opener includes a threaded shank received in a threaded bore through the fluid deflector housing, a handle for rotating the threaded shank, and the valve engaging surface on the threaded shank and within the fluid deflector housing.

5. A hydraulic coupler pressure relief tool comprising:
a male coupler holder having a holder end with a U-shaped slot having an open end, a pair of spaced apart side walls and a slot closed end, a hand hold end, a hand grip surface on the hand hold end, and a pivot pin bore through the male coupler holder between the U-shaped slot and the hand holder end;
a coupler retainer with a retainer bar end, a retainer hand holder end, a retainer hand grip on the retainer bar end that faces toward the retainer hand holder end, and a retainer pivot pin bore through the coupler retainer between the retainer bar end and the retainer hand holder end;
a pivot pin passing through the retainer pivot pin bore and the pivot pin bore and pivotally connecting the coupler retainer to the male coupler holder and wherein the male coupler retainer is pivoted between an open position in which the open end of the U-shaped slot is open and a closed position in which the open end of the U-shaped slot is closed;
a fluid deflector housing covering at least a portion of the U-shaped slot;
a check valve opener including a threaded shank that is received in a threaded bore through the fluid deflector housing, a handle for rotating the threaded shank, and a valve engaging surface on the threaded shank that is moveable toward the U-shaped slot in a direction parallel to a pivot pin axis of the retainer pivot pin bore by rotation of the threaded shank.

6. A hydraulic coupler pressure relief tool, as set forth in claim 5, wherein the U-shaped slot receives male couplers with the spaced apart side walls of the U-shaped slot extending into locking ball receiving grooves of male couplers.

7. A hydraulic coupler pressure relief tool, as set forth in claim 5, wherein the male coupler engaging surface extends into locking ball receiving grooves in male couplers while opening male coupler check valves.

8. A hydraulic coupler pressure relief tool, as set forth in claim 5, wherein the male coupler engaging surface engages male coupler housings while opening male coupler check valves.

9. A hydraulic coupler pressure relief tool, as set forth in claim 5, wherein the pair of spaced apart side walls of the U-shaped slot are substantially parallel.

10. A hydraulic coupler pressure relief tool, as set forth in claim 5, including a male coupler passage into the fluid deflector housing.

11. A hydraulic coupler pressure relief tool, as set forth in claim 5, including a retainer bar passage into the fluid deflector housing.

* * * * *